US010833742B2

(12) United States Patent
Nammi

(10) Patent No.: US 10,833,742 B2
(45) Date of Patent: Nov. 10, 2020

(54) DETERMINING CHANNEL STATE INFORMATION IN ADVANCED NETWORKS

(71) Applicant: AT&T Intellectual Property I, L.P., Atlanta, GA (US)

(72) Inventor: SaiRamesh Nammi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/383,519

(22) Filed: Apr. 12, 2019

(65) Prior Publication Data

US 2020/0052751 A1    Feb. 13, 2020

Related U.S. Application Data

(60) Provisional application No. 62/717,617, filed on Aug. 10, 2018.

(51) Int. Cl.
| | | |
|---|---|---|
| *H04L 1/02* | (2006.01) | |
| *H04B 7/0456* | (2017.01) | |
| *H04B 7/06* | (2006.01) | |
| *H04W 84/04* | (2009.01) | |

(52) U.S. Cl.
CPC ......... *H04B 7/0486* (2013.01); *H04B 7/0632* (2013.01); *H04B 7/0634* (2013.01); *H04W 84/042* (2013.01)

(58) Field of Classification Search
CPC ..... H04L 1/0618; H04L 1/06; H04L 65/4076; H04W 28/0231; H04W 88/02
USPC .................................................. 375/267, 260
See application file for complete search history.

(56) References Cited

U.S. PATENT DOCUMENTS

| | | |
|---|---|---|
| 8,787,480 B2 | 7/2014 | Gupta et al. |
| 9,167,465 B2 | 10/2015 | Chun et al. |
| 9,252,930 B2 | 2/2016 | Qu et al. |
| 9,294,310 B2 | 3/2016 | Wu et al. |
| 9,363,700 B2 | 6/2016 | Su et al. |
| 9,456,439 B2 | 9/2016 | Yang et al. |
| 9,578,532 B2 | 2/2017 | Chun et al. |
| 9,763,129 B2 | 9/2017 | Xia et al. |
| 9,967,012 B2 | 5/2018 | Onggosanusi et al. |
| 2015/0030058 A9 * | 1/2015 | Varadarajan ......... H04B 7/0417 375/221 |
| 2016/0173182 A1 * | 6/2016 | Jongren ................ H04L 5/0048 370/329 |

(Continued)

*Primary Examiner* — Khai Tran
(74) *Attorney, Agent, or Firm* — Amin, Turocy & Watson, LLP

(57) ABSTRACT

Facilitating a determination of channel state information for advanced networks (e.g., 4G, 5G, and beyond) is provided herein. Operations of a system can comprise configuring a mobile device with a demodulation reference signal. The operations can also comprise transmitting a channel state information reference signal to the mobile device, wherein the channel state information reference signal configures a number of channel state information reference signal ports. Operations of another system can comprise determining a number of resources for a group of transmission ranks and determining a link quality metric for transmission ranks of the group of transmission ranks. The operations can also comprise selecting a transmission rank and a precoding matrix indicator and transmitting the precoding matrix indicator to a network device.

20 Claims, 10 Drawing Sheets

(56) References Cited

U.S. PATENT DOCUMENTS

| | | | |
|---|---|---|---|
| 2017/0070278 A1* | 3/2017 | Suikkanen | H04L 1/0003 |
| 2017/0353882 A1 | 12/2017 | Xia et al. | |
| 2018/0184318 A1 | 6/2018 | Su et al. | |
| 2018/0198511 A1* | 7/2018 | Maamari | H04B 7/0695 |
| 2018/0279149 A1 | 9/2018 | Li et al. | |
| 2019/0313456 A1* | 10/2019 | Liu | H04W 72/0446 |

* cited by examiner

DETERMINING CHANNEL STATE INFORMATION IN ADVANCED NETWORKS

CROSS-REFERENCE TO RELATED APPLICATIONS

This application claims the benefit of U.S. Provisional Application Ser. No. 62/717,617, filed Aug. 10, 2018, and entitled "DETERMINING CHANNEL STATE INFORMATION IN ADVANCED NETWORKS", the entirety of which is expressly incorporated herein by reference.

TECHNICAL FIELD

This disclosure relates generally to the field of mobile communication and, more specifically, to determining channel state information in wireless communication systems for advanced networks (e.g., 4G, 5G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
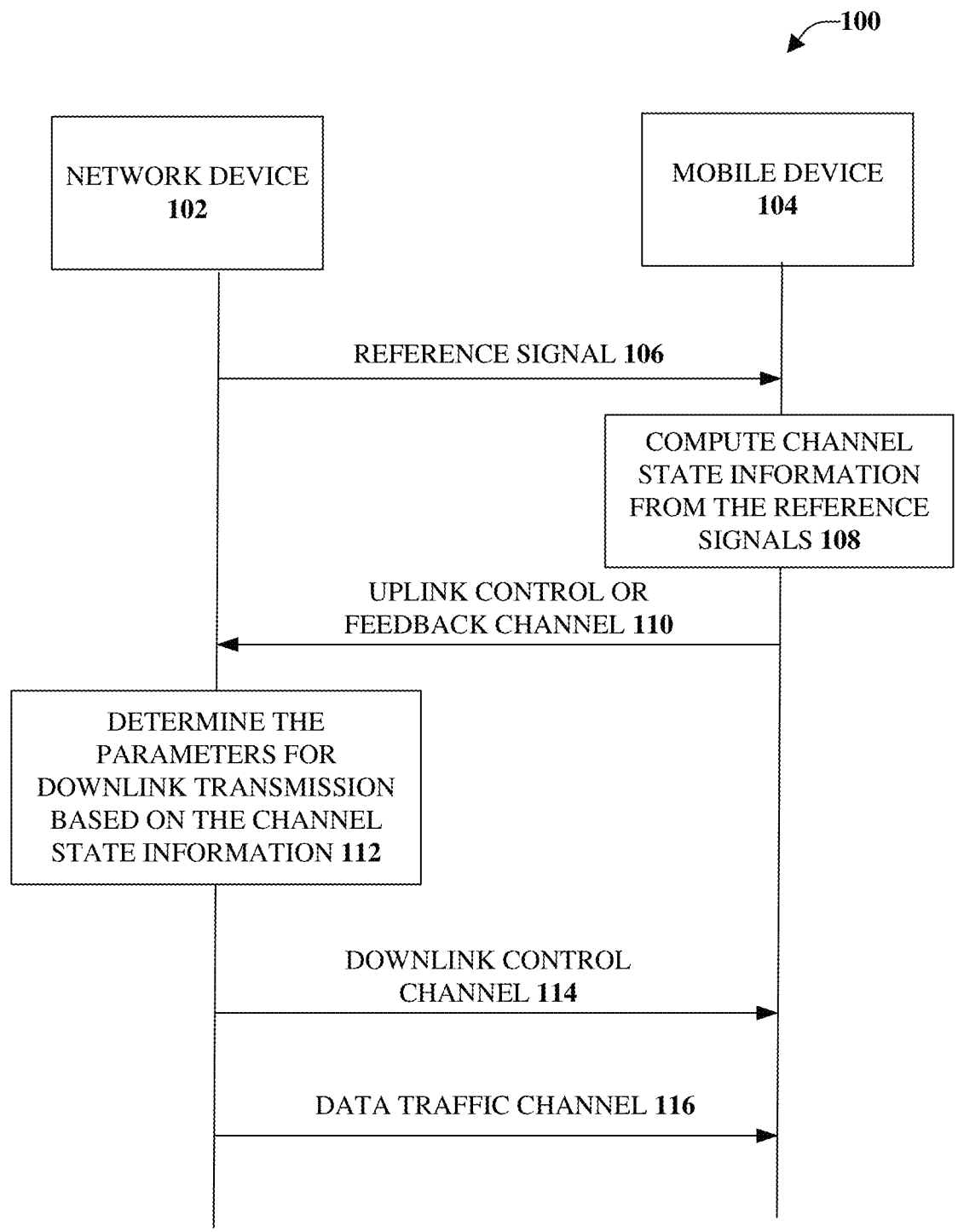
FIG. 1 illustrates an example, non-limiting message sequence flow chart that can facilitate downlink data transfer in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, computer-implemented methods, articles of manufacture, and other embodiments or implementations that can facilitate determining channel state information for advanced networks. More specifically described herein are aspects related to wireless communication systems and related to determining channel state information including determining rank indicator, precoding matrix indicator, and/or channel quality information in a multi antenna wireless communication system.

An embodiment relates to a method that can comprise determining, by a mobile device comprising a processor, a number of resources for a group of transmission ranks. The method can also comprise determining, by the mobile device, a link quality metric for transmission ranks of the group of transmission ranks. Further, the method can comprise, selecting, by the mobile device, a transmission rank from the group of transmission ranks and a precoding matrix indicator, resulting in a selected precoding matrix indicator. Also, the method can comprise transmitting, by the mobile device, the precoding matrix indicator to a network device.

In an example, selecting the transmission rank and the precoding matrix indicator can comprise using mutual information for a first selection of the transmission rank and a second selection of the precoding matrix indicator. Further to this example, the method can comprise determining, by the mobile device, channel quality indicator information based on the transmission rank and the precoding matrix indicator.

According to some implementations, selecting the transmission rank and the precoding matrix indicator can comprise using a capacity-based approach. In accordance with some implementations, selecting the transmission rank can comprise selecting the transmission rank from the group of transmission ranks. Further, resource blocks of the transmission ranks in the group of transmission ranks can comprise respective overhead values.

According to an example, selecting the transmission rank can comprise selecting the transmission rank based on capacity information determined for the transmission rank satisfying a defined capacity information threshold. The capacity information can be indicative of a data carrying capacity for the transmission rank. According to another example, selecting the transmission rank can comprise selecting the transmission rank based on mutual information per symbol determined as a function of post-processing signal to interference plus noise ratio for the transmission ranks of the group of transmission ranks.

In some implementations, the method can comprise transmitting, by the mobile device, the selected precoding matrix indicator to a network device of a group of network devices of a communications network. Further to these implementations, transmitting the selected precoding matrix indicator to the network device can comprise transmitting the precoding matrix indicator via an uplink channel configured to operate according to a fifth generation wireless network communication protocol.

In another embodiment, described herein is a system that can comprise a processor and a memory that stores executable instructions that, when executed by the processor, facilitate performance of operations. The operations can comprise determining, for transmission ranks of a group of transmission ranks, a number of resources and respective link quality metrics. The operations can also comprise choosing, a transmission rank from the group of transmission ranks and a precoding matrix indicator from a group of precoding matrix indicators.

According to some implementations, the operations can comprise facilitating a first selection of the transmission rank and a second selection of the precoding matrix indicator based on mutual information per symbol determined as a function of post-processing signal to interference plus noise ratio for the transmission ranks of the group of transmission ranks. Further, in some implementations, the operations can comprise facilitating a choice of the transmission rank and the precoding matrix indicator based on a capacity-based approach. In some implementations, the operations can comprise determining a channel quality indicator information based on the transmission rank and the precoding matrix indicator.

The operations can also comprise facilitating a transmission of the precoding matrix indicator, selected from the group of precoding matrix indicators, to a network device of a group of network devices in a communications network. Further, the operations can comprise transmitting the precoding matrix indicator via an uplink channel configured to operate according to a fifth generation wireless network communication protocol.

Another embodiment relates to a machine-readable storage medium, comprising executable instructions that, when executed by a processor, facilitate performance of operations. The operations can comprise configuring a mobile device with a demodulation reference signal. The operations can also comprise transmitting a channel state information reference signal to the mobile device. The channel state information reference signal can be utilized to configure a number of channel state information reference signal ports.

In an example, configuring the mobile device can comprise configuring the mobile device with a type 1 demodulation reference signal pattern. In another example, configuring the mobile device can comprise configuring the mobile device with a type 2 demodulation reference signal pattern.

According to another example, configuring the mobile device can comprise configuring the mobile device with a single symbol. In accordance with another example, configuring the mobile device can comprise configuring the mobile device with two symbols.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE.

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t, N_r)$ system, where $N_t$ denotes the number of transmit antennas and $N_r$ denotes the receive antennas, the peak data rate multiplies with a factor of $N_t$ over single antenna systems in rich scattering environment.

Referring initially to FIG. 1, illustrated is an example, non-limiting message sequence flow chart 100 that can facilitate downlink data transfer in accordance with one or more embodiments described herein. The non-limiting message sequence flow chart 100 can be utilized for new radio, as discussed herein. As illustrated, the non-limiting message sequence flow chart 100 represents the message sequence between a network device 102 and a mobile device 104. As used herein, the term "network device 102" can be interchangeable with (or include) a network, a network controller or any number of other network components. One or more pilot signals and/or reference signals 106 can be transmitted from the network device 102 to the mobile device 104. The one or more pilot signals and/or reference signals 106 can be cell specific and/or user equipment specific signals. The one or more pilot signals and/or reference signals 106 can be beamformed or non-beamformed.

Based on the one or more pilot signals and/or reference signals 106, the mobile device 104 can compute the channel estimates and can determine the one or more parameters needed for channel state information (CSI) reporting, as indicated at 108). The CSI report can comprise, for example, channel quality indicator (CQI), preceding matrix index (PMI), rank information (RI), Channel State Information Reference Signal (CSI-RS) Resource Indicator (CRI the same as beam indicator), and so on, or any number of other types of information.

The CSI report can be sent from the mobile device 104 to the network device 102 via a feedback channel (e.g., uplink control or feedback channel 110). The CSI report can be sent either on request from the network device 102, a-periodically, and/or the mobile device 104 can be configured to report periodically.

The network device 102, which can comprise a scheduler, can use the CSI report for choosing the parameters for scheduling of the particular mobile device 104. For example, as indicated at 112, the network device 102 can determine the parameters for downlink transmission based on the channel state information. The parameters for downlink transmission can include but are not limited to: Modulation and Coding Scheme (MCS), power, Physical Resource Blocks (PRBs), and so on.

The network device 102 can send the scheduling parameters to the mobile device 104 in a downlink control channel (e.g., downlink control channel 114). After the scheduling parameter information is transmitted, the actual data transfer can take place from the network device 102 to the mobile device 104 over the data traffic channel 116.

Downlink reference signals are predefined signals occupying specific resource elements within the downlink time-frequency grid. There are several types of downlink reference signals that are transmitted in different ways and used for different purposes by the receiving terminal (e.g., the mobile device 104). For example, downlink reference signals can include CSI reference signals (CSI-RS) and demodulation reference signals (DM-RS).

CSI reference signals are specifically intended to be used by terminals (e.g., the mobile device 104) to acquire channel-state information (CSI) and beam specific information (beam RSRP). In 5G, CSI-RS is mobile device specific. Therefore, the CSI-RS can have a significantly lower time/frequency density.

Demodulation reference signals (also sometimes referred to as UE-specific reference signals), are specifically intended to be used by terminals for channel estimation for data channel. The label "UE-specific" relates to the fact that each demodulation reference signal is intended for channel estimation by a single terminal. That specific reference signal is then only transmitted within the resource blocks assigned for data traffic channel transmission to that terminal.

Other than the above-mentioned reference signals, there are other reference signals, namely phase tracking and tracking and sounding reference signals, which can be used for various purposes.

An uplink control channel carries information about Hybrid Automatic Repeat Request (HARQ-ACK) information corresponding to the downlink data transmission, and channel state information. The channel state information can comprise CSI-RS Resource Indicator (CRI), Rank Indicator (RI), Channel Quality Indicator (CQI), Precoding Matrix Indicator (PMI), and Layer Indicator, and so on. The CSI can be divided into two categories. A first category can be for sub band and a second category can be for wideband. The configuration of subband and/or wideband CSI reporting can be performed through RRC signaling as part of CSI reporting configuration. Table 1 below illustrates example contents of an example, CSI report for both wideband and side band. Specifically, Table 1 illustrates the contents of a report for PMI format indicator=Wideband, CQI format indicator=wideband and for PMI format indicator=subband, CQI format indicator=subband.

TABLE 1

| PMI-FormatIndicator = widebandPMI and CQI-FormatIndicator = widebandCQI | | PMI-FormatIndicator = subbandPMI or CQI-FormatIndicator = subbandCQI | |
|---|---|---|---|
| | | | CSI Part II |
| | CSI Part I | wideband | Subband |
| CRI | CRI | Wideband CQI for the second TB | Subband differential CQI for the second TB of all even subbands |
| Rank Indicator | Rank Indicator | PMI wideband (X1 and X2) | PMI subband information fields $X_2$ of all even subbands |
| Layer Indicator | Layer Indicator | — | Subband differential CQI for the second TB of all odd subbands |
| PMI wideband (X1 and X2) | Wideband CQI | — | PMI subband information fields $X_2$ of all odd subbands |
| Wideband CQI | Subband differential CQI for the first TB | — | — |

It is noted that for NR, the subband can be defined according to the bandwidth part of the OFDM in terms of PRBs as shown in Table 2 below, which illustrates configurable subband sizes. The sub band configuration can also be performed through RRC signaling.

TABLE 2

| Carrier bandwidth part (PRBs) | Subband Size (PRBs) |
|---|---|
| <24 | N/A |
| 24-72 | 4, 8 |
| 73-144 | 8, 16 |
| 145-275 | 16, 32 |

The downlink control channel (PDCCH) can carry information about the scheduling grants. This can comprise a number of MIMO layers scheduled, transport block sizes, modulation for each codeword, parameters related to HARQ, sub band locations, and so on. It is noted that all DCI formats may not use and/or transmit all the information as shown above. In general, the contents of PDCCH depends on transmission mode and DCI format.

In some cases, the following information is transmitted by means of the downlink control information (DCI) format: carrier indicator, identifier for DCI formats, bandwidth part indicator, frequency domain resource assignment, time domain resource assignment, Virtual Resource Block (VRB)-to-PRB mapping flag, PRB bundling size indicator, rate matching indicator, Zero Power (ZP) CSI-RS trigger, modulation and coding scheme for each Transport Block (TB), new data indicator for each TB, redundancy version for each TB, HARQ process number, downlink assignment index, Transmit Power Control (TPC) command for uplink control channel, Physical Uplink Control Channel (PUCCH) resource indicator, Physical Downlink Shared Channel (PDSCH)-to-HARQ feedback timing indicator, antenna port(s), transmission configuration indication, Sounding Reference Signal (SRS) request, Code Block Group (CBG) transmission information, CBG flushing out information, Demodulation Reference Signal (DMRS) sequence initialization, and so on.

Figure 2:
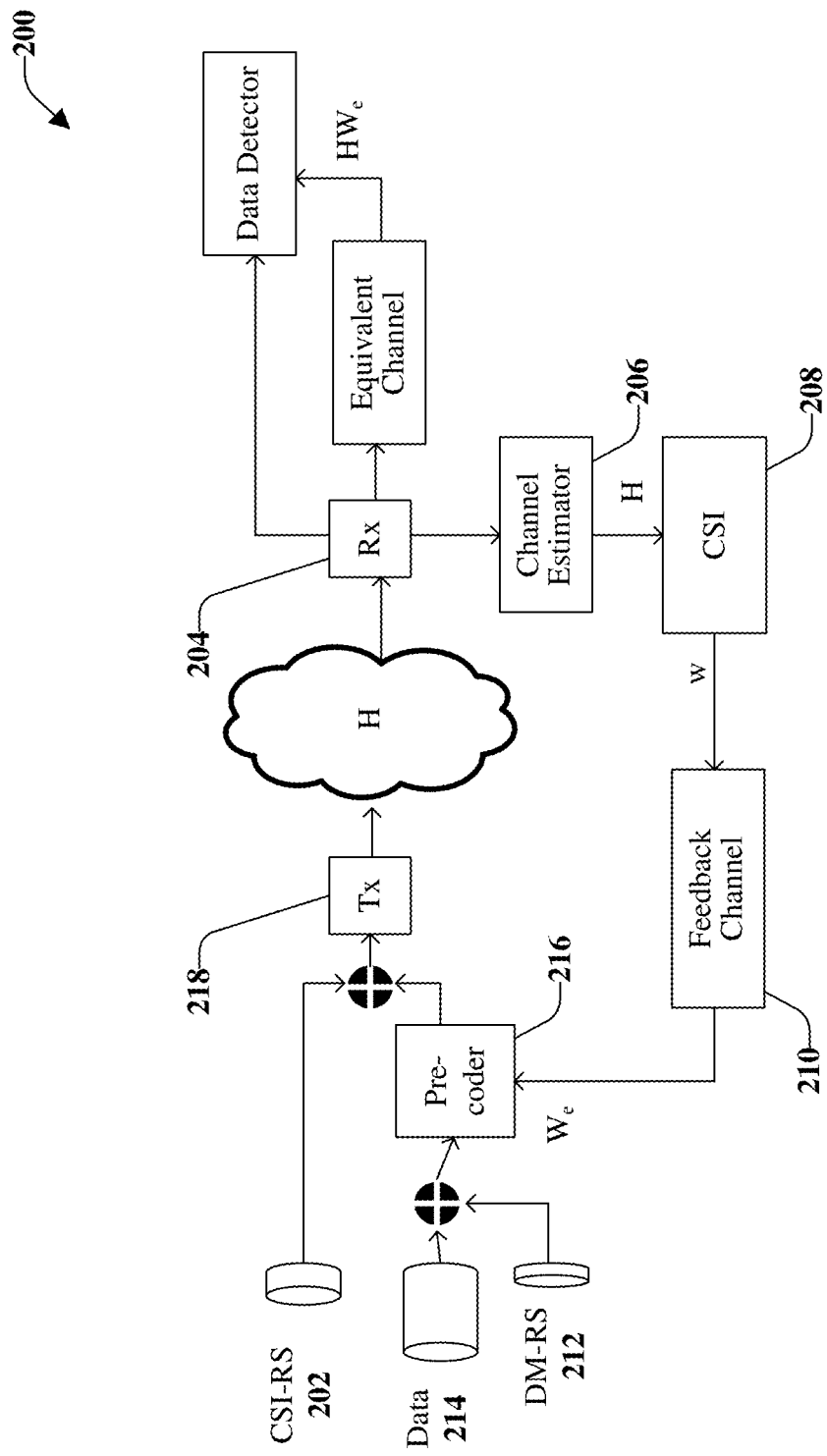
FIG. 2 illustrates an example, non-limiting system diagram of a Multiple Input Multiple Output (MIMO) system with Demodulation Reference Signals (DM-RS) in accordance with one or more embodiments described herein.

FIG. 2 illustrates an example, non-limiting, system diagram 200 of a Multiple Input Multiple Output (MIMO) system with Demodulation Reference Signals (DM-RS) in accordance with one or more embodiments described herein. MIMO systems can significantly increase the data carrying capacity of wireless systems. MIMO can be used for achieving diversity gain, spatial multiplexing gain, and beamforming gain. For these reasons, MIMO is an integral part of 3G and 4G wireless systems. In addition, massive MIMO systems are currently under investigation for 5G systems and more advanced systems.

The system diagram 200 is an example, non-limiting conceptual diagram of a MIMO system with demodulation reference signal. At a gNode B transmitter, common reference signals, namely CSI-RS 202 are transmitted for channel sounding. The UE receiver 204 estimates channel quality (typically Signal to Interference plus Noise Ratio (SINR)) from channel sounding (e.g., via a channel estimator device 206), and computes the preferred precoding matrix (PMI), rank indicator (RI), and CQI for the next downlink transmission. This information is referred to as channel state information (CSI) 208. The UE conveys this information through a feedback channel 210 (e.g., the uplink control or feedback channel 110 as discussed with respect to FIG. 1).

For downlink data transmission, the gNode B uses this information and chooses the precoding matrix as suggested by the UE (or the gNodeB can choose a precoding matrix on its own, which can be other than the UE recommended PMI), CQI, and the transport block size, and so on. Finally, both the reference signal (DM-RS) 212 and the data 214 are multiplied by the precoding matrix (e.g., pre-coder device 216) selected by the gNode B and transmitted, indicated at 218. The UE receiver estimates the effective channel (e.g., the channel multiplied by the precoding matrix) and demodulates the data.

Figure 3A:
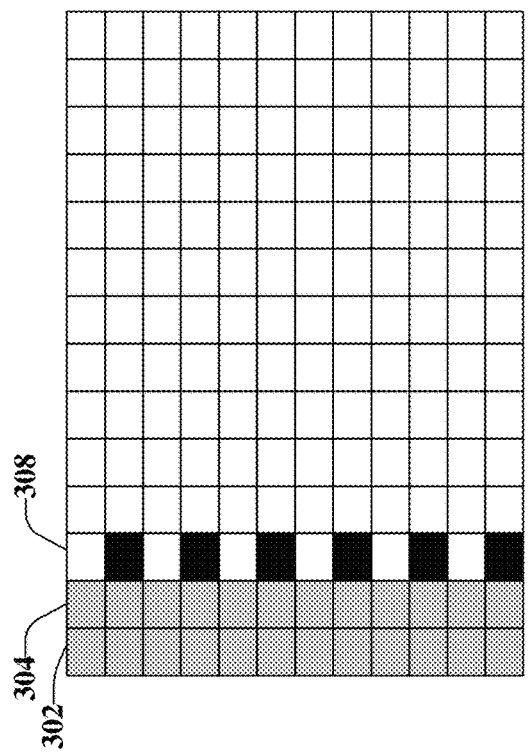
FIG. 3A illustrates resource mapping for antenna port one in accordance with one or more embodiments described herein.
Figure 3B:
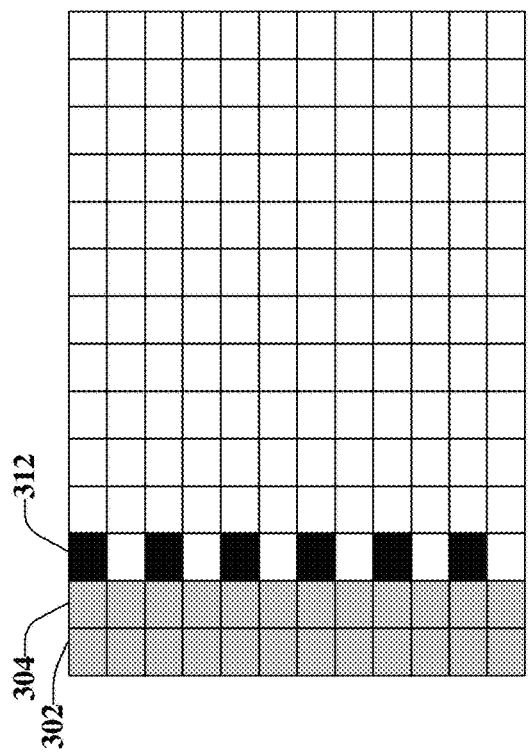
FIG. 3B illustrates resource mapping for antenna port two in accordance with one or more embodiments described herein.
Figure 3C:
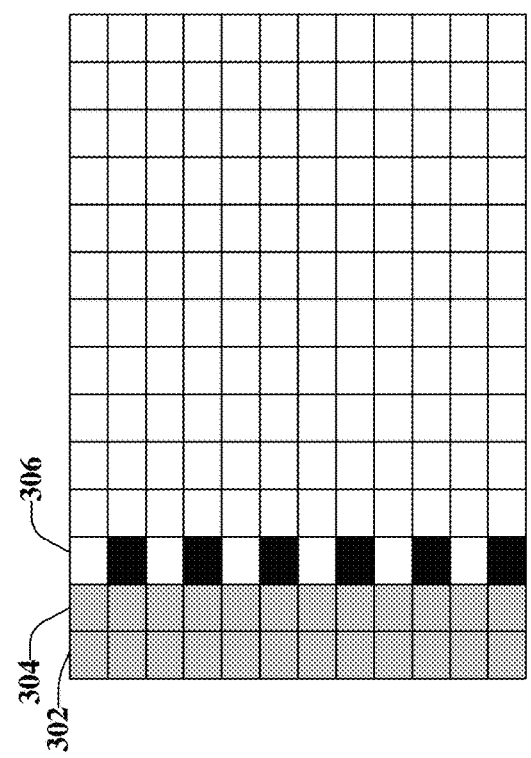
FIG. 3C illustrates resource mapping for antenna port three in accordance with one or more embodiments described herein.
Figure 3D:
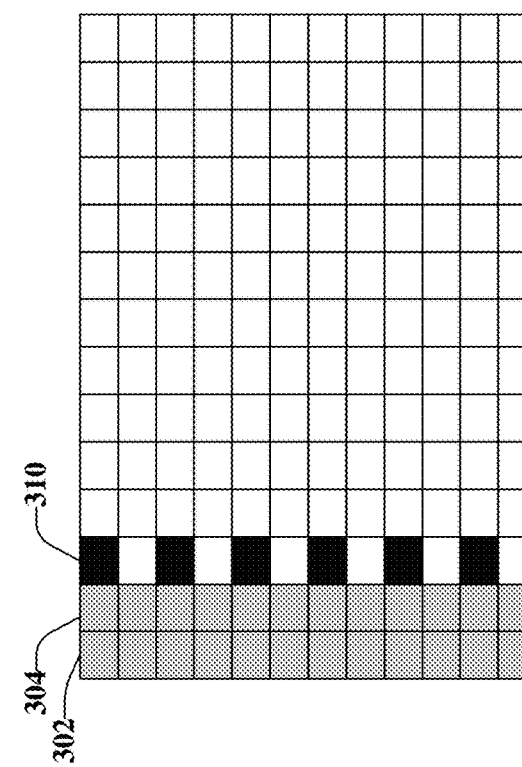
FIG. 3D illustrates resource mapping for antenna port four in accordance with one or more embodiments described herein.

FIGS. 3A to 3D illustrate non-limiting examples of resource mapping for a Demodulation Reference Signal (DM-RS) structure for up to four antenna ports in accordance with one or more embodiments described herein. Specifically, FIG. 3A illustrates resource mapping for antenna port one; FIG. 3B illustrates resource mapping for antenna port two; FIG. 3C illustrates resource mapping for antenna port three; and FIG. 3D illustrates resource mapping for antenna port four.

As indicated, FIGS. 3A to 3D illustrate an example of DM-RS structure for 4 antenna ports (hence maximum 4 layers and 4 DM-RS) in NR system. The first two OFDM symbols in FIGS. 3A-3D are control symbols (indicated by columns 302 and 304).

As illustrated in FIG. 3A, six reference symbols, indicated as the dark squares in the third OFDM symbol (e.g., indicated as third column 306) within a resource-block are transmitted for a single antenna port 0. As illustrated in FIG. 3B, the same reference symbols, indicated as the dark squares in the third OFDM symbol (indicated as the third column 308) are code multiplexed and transmitted on antenna port 1.

In a similar manner, for ports 2 (FIG. 3C) and port 3 (FIG. 3D) the same resource elements are used for transmitting DMRS reference symbols. These are illustrated by the dark squares in the third column 310 of FIG. 3C and the third column 312 of FIG. 3D. However, they are code multiplexed as in port 0 and 1. Note that the resource elements are used for rank 3 and 4 (ports 2 and 3) are orthogonal in frequency to that of port 0 and 1. The other reference symbols in FIGS. 3A to 3D can be utilized for data.

As the number of transmitted layers can vary dynamically, the number of transmitted DM-RS can also vary. The terminal can be informed about the number of transmitted layers (or the rank) as part of the scheduling information via downlink control channel as explained with respect to FIG. 1.

As demonstrated by the NR design for DMRS, the number of resource elements changes according to the transmission rank. That is, if the network schedules a higher rank, a higher number of resource elements are used, while with a lower rank a less number of resources are used. For example, for the embodiments demonstrated by FIG. 3C and FIG. 3D, a total of twelve resource elements are used (e.g., the six resource elements used for Rank 1 and Rank 2, and the resource elements used for Rank 3 and Rank 4, respectively).

However, with this adaptive number of resource elements the UE has to compute the CSI and report this information to the network. Conventional techniques involve the UE assuming a fixed number of resources in CSI computation. However, if the rank is equal to 1, for example, even though the UE is reporting rank as 1, it does not assume the resource elements reserved for reference signals 3 and 4. That is, during the CSI computation it assumes that these resource elements are not used. Hence with the conventional technique there is significant reduction in throughput of the NR system. Accordingly, an efficient solution is needed to compute the CSI at the UE and report this information to the network, as discussed herein.

Figure 4:
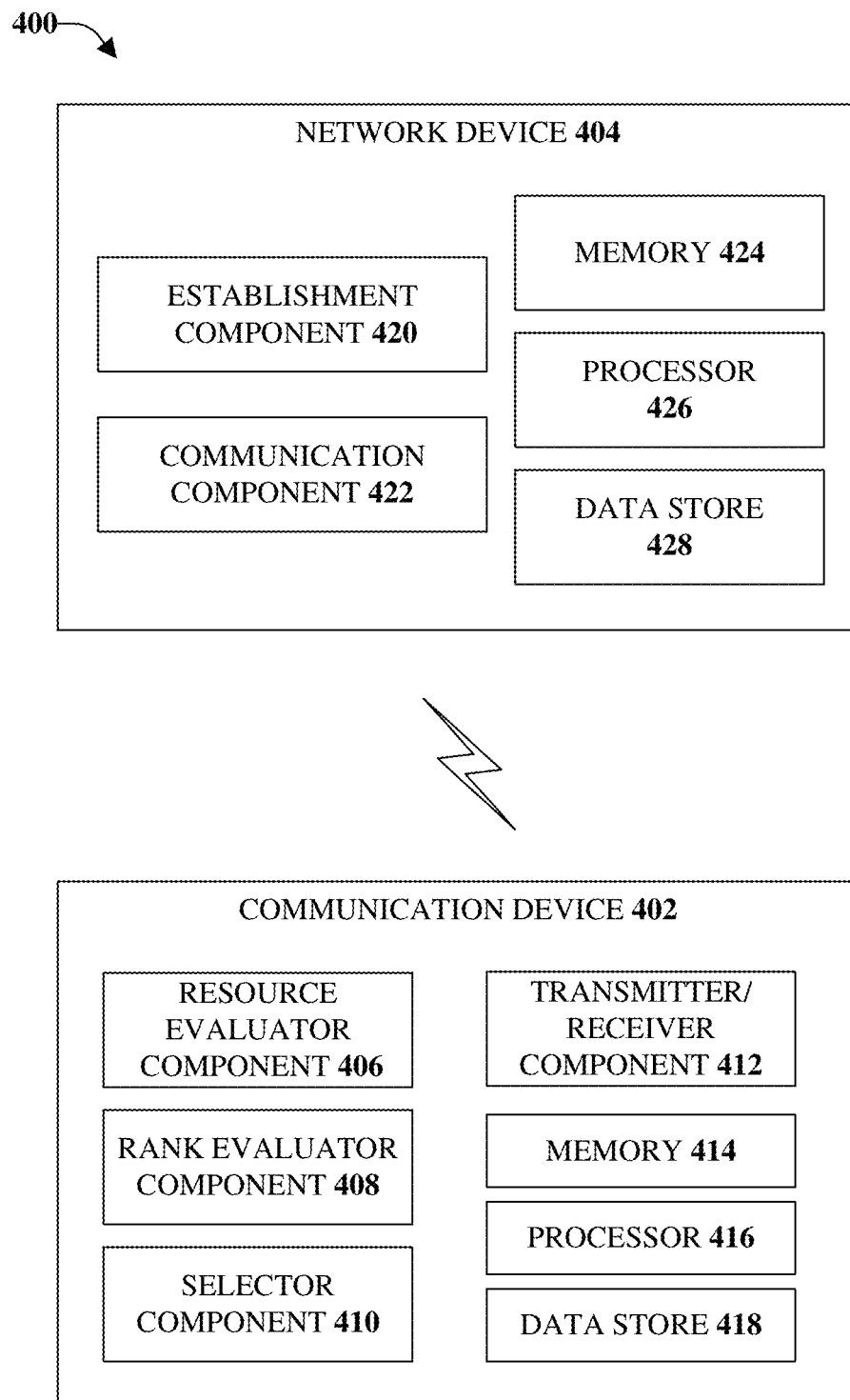
FIG. 4 illustrates an example, non-limiting, system for determining channel state information in advanced networks in accordance with one or more embodiments described herein.

FIG. 4 illustrates an example, non-limiting, system 400 for determining channel state information in advanced networks in accordance with one or more embodiments described herein. Aspects of systems (e.g., the system 400 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 400 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 400 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 4, the system 400 can include a communication device 402 and a network device 404. The network device 404 can be included in a group of network devices of a wireless network. Although only a single communication device and a single network device are shown and described, the various aspects are not limited to this implementation. Instead, multiple communication devices and/or multiple network devices can be included in a communications system.

The communication device 402 can include a resource evaluator component 406, a rank evaluator component 408, a selector component 410, a transmitter/receiver component 412, at least one memory 414, at least one processor 416, and at least one data store 418. The network device 404 can include an establishment component 420, a communication component 422, at least one memory 424, at least one processor 426, and at least one data store 428.

The resource evaluator component 406 can determine a number of resources for a group of transmission ranks. The rank evaluator component 408 can determine respective link quality metrics for transmission ranks of the group of transmission ranks. Further, the selector component 410 can select a transmission rank and a precoding matrix indicator resulting in a selected precoding matrix indicator. According to some implementations, the selection by the selector component 410 can be based on the respective link quality metrics. For example, the selector component 410 can select the transmission rank and the precoding matrix indicator by using mutual information for a first selection of the transmission rank and a second selection of the precoding matrix indicator. Further to this example, the communication device 402 can determine a channel quality indicator information based on the transmission rank and the precoding matrix indicator.

According to some implementations, the selector component 410 can select the transmission rank from the group of transmission ranks. Further, resource blocks of the transmission ranks in the group of transmission ranks comprise respective overhead values.

According to some implementations, the establishment component 420 can configure the communication device 402 with a demodulation reference signal. For example, the establishment component 420 can configure the communication device 402 with a type 1 demodulation reference signal pattern. In another example, the establishment component 420 can configure the communication device 402 with a type 2 demodulation reference signal pattern. In a further example, the establishment component 420 can configure the communication device 402 with a single symbol. According to yet another example, the establishment component 420 can configure the communication device 402 with two symbols.

Further, the establishment component 422 can transmit a channel state information reference signal to the communication device 402. The channel state information reference signal can configure a number of channel state information reference signal ports.

The transmitter/receiver component 412 can transmit the selected precoding matrix indicator to the network device 404. In an example, the transmitter/receiver component 412 can transmit the selected precoding matrix indicator via an uplink channel configured to operate according to a fifth generation wireless network communication protocol.

The transmitter/receiver component 412 (and/or the communication component 422) can be configured to transmit to, and/or receive data from, the network device 404 (or the communication device 402), other network devices, and/or other communication devices. Through the transmitter/receiver component 412 (and/or the communication component 422), the communication device 402 (and/or the network device 404) can concurrently transmit and receive data, can transmit and receive data at different times, or combinations thereof. According to some implementations, the transmitter/receiver component 412 (and/or the communication component 422) can facilitate communications between an identified entity associated with the communication device 402 (e.g., an owner of the communication device 402, a user of the communication device 402, and so on) and another communication device (e.g., or an entity associated with the other communication device). Further, the transmitter/receiver component 412 (and/or the communication component 422) can be configured to receive, from the network device 404 or other network devices, various content including multimedia content.

The at least one memory 414 can be operatively connected to the at least one processor 416. Further, the at least one memory 424 can be operatively connected to the at least one processor 426. The memories (e.g., the at least one memory 414, the at least one memory 424) can store executable instructions that, when executed by the processors (e.g., the at least one processor 416, the at least one processor 426) can facilitate performance of operations. Further, the processors can be utilized to execute computer executable components stored in the memories.

For example, the memories can store protocols associated with determining channel state information in advanced networks as discussed herein. Further, the memories can facilitate action to control communication between the communication device 402 and the network device 404 such that the system 400 can employ stored protocols and/or algorithms to achieve improved communications in a wireless network as described herein.

The memories can store respective protocols associated with determining channel state information, taking action to control communication between the communication device 402 and the network device 404, such that the system 400 can employ stored protocols and/or algorithms to achieve improved communications in a wireless network as described herein. It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The processors can facilitate respective analysis of information related to transmitted information embedded in one or more messages in a communication network. The processors can be processors dedicated to analyzing and/or generating information received, a processor that controls one or more components of the system 400, and/or a processor that both analyzes and generates information received and controls one or more components of the system 400.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 404) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an Remote Radio Unit (RRU), a Remote Radio Head (RRH), nodes in distributed antenna system (DAS), and the like.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
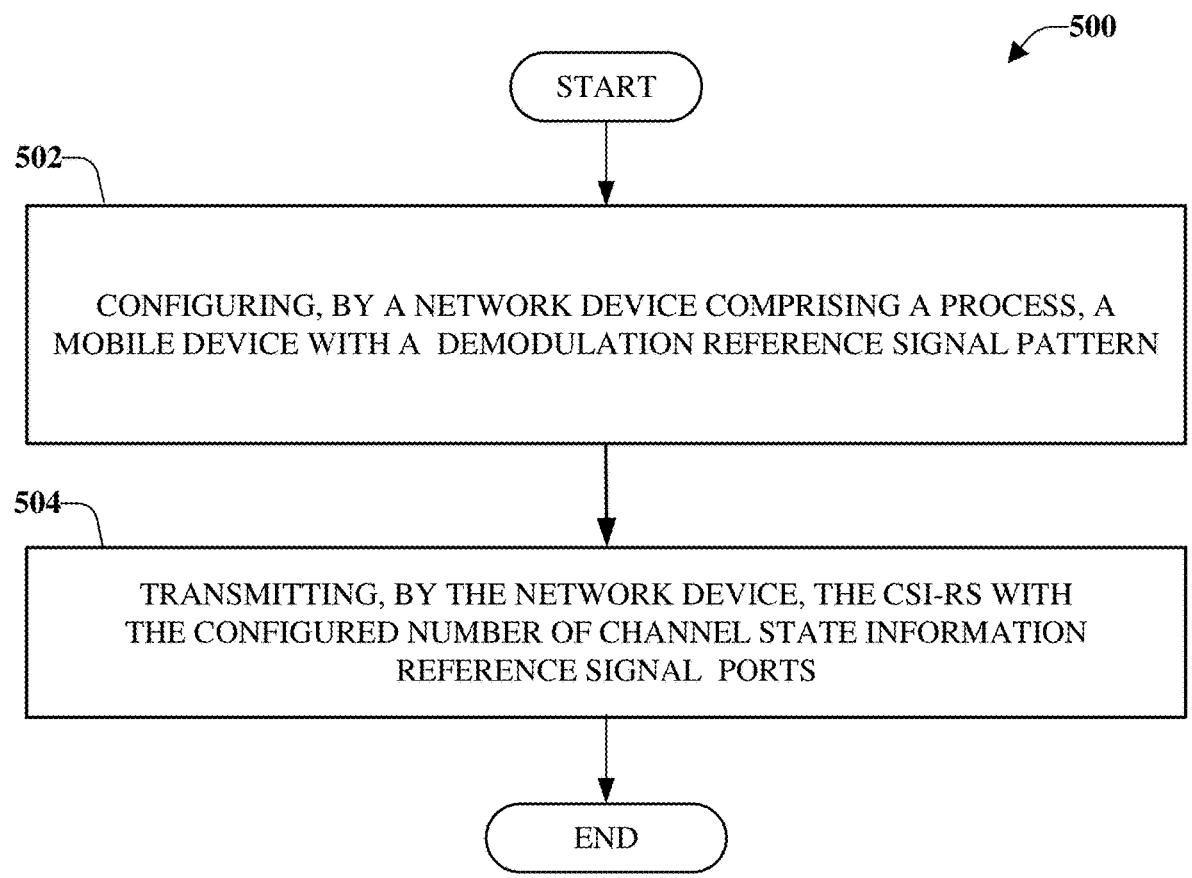
FIG. 5 illustrates an example, non-limiting, computer-implemented method for a network device to compute or determine the channel state information in accordance with one or more embodiments described herein.

FIG. 5 illustrates an example, non-limiting, computer-implemented method 500 for a network device to compute or determine the channel state information in accordance with one or more embodiments described herein. Repetitive description of like elements employed in other embodiments described herein is omitted for sake of brevity. The computer-implemented method 500 can be implemented by a network device of a wireless network, the network device comprising a processor. Alternatively, or additionally, a machine-readable storage medium can comprise executable instructions that, when executed by a processor, facilitate performance of operations for the computer-implemented method 500.

As mentioned, the disclosed aspects can facilitate a computer-implemented method to compute or determine the channel state information, namely rank indicator, precoder matrix indicator, and channel quality indicator by assuming an adaptive structure of the reference signal. At 502, the network device can configure the UE with DMRS pattern (e.g., via the establishment component 420). For example, the DMRS pattern can be: either Type 1 or Type 2, front loaded with additional or no additional, single symbol or two symbol. Further, at 504, the network device can transmit the CSI-RS with the configured number of CSI-RS ports (e.g., via the communication component 422).

Figure 6:
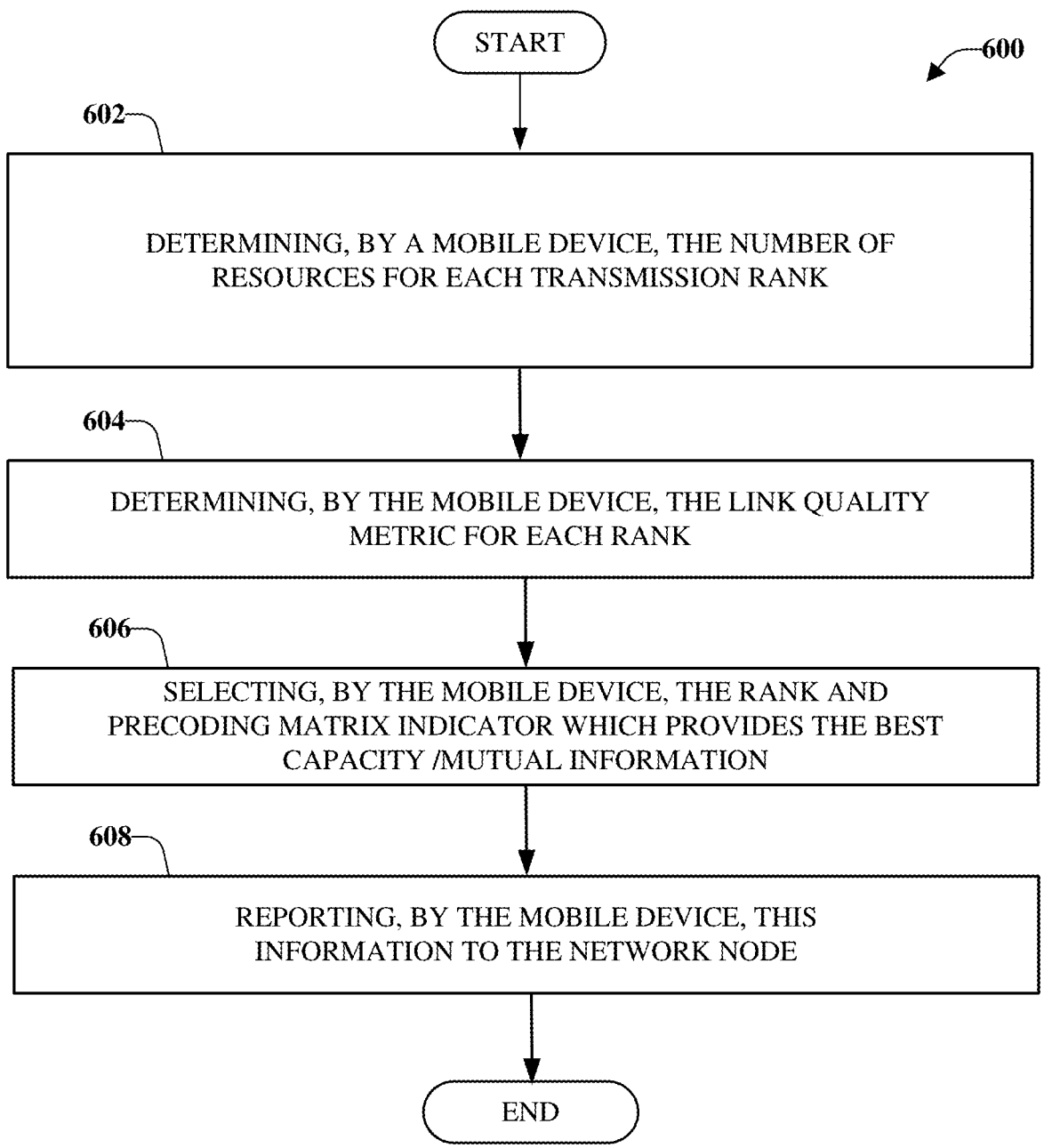
FIG. 6 illustrates an example, non-limiting, computer-implemented method for a device to compute or determine the channel state information in accordance with one or more embodiments described herein.

FIG. 6 illustrates an example, non-limiting, computer-implemented method 600 for a device to compute or determine the channel state information in accordance with one or more embodiments described herein. Repetitive description of like elements employed in other embodiments described herein is omitted for sake of brevity. The computer-implemented method 600 can be implemented by a mobile device (also referred to as User Equipment (UE)) of a wireless network, the mobile device comprising a processor. Alternatively, or additionally, a machine-readable storage medium can comprise executable instructions that, when executed by a processor, facilitate performance of operations for the computer-implemented method 600.

For channel state information, at 602, the UE can compute the number of resources for each transmission rank (e.g., via the resource evaluator component 406). At 604, the UE can compute the link quality metric for each rank (e.g., via the rank evaluator component 408).

Further, at 606, the UE can choose the rank and PMI which provides the best capacity/mutual information (e.g., via the selector component 410). According to an example, a first selection of the transmission rank and a second selection of the precoding matrix indicator can be facilitated based on mutual information. In another example, a choice of the transmission rank and the precoding matrix indicator can be facilitated based on a capacity-based approach. According to some implementations, the computer-implemented method can determine a channel quality indicator information based on the transmission rank and the precoding matrix indicator.

At 608, the UE can report this information to the network node (e.g., via the transmitter/receiver component 412). For example, the computer-implemented method can facilitate a transmission of the precoding matrix indicator, selected from the group of precoding matrix indicators, to a network device of a group of network devices in a communications network. For example, the precoding matrix indicator can be transmitted via an uplink channel configured to operate according to a fifth generation wireless network communication protocol.

With the various aspects provided herein for determining the channel state information, the UE can compute the accurate channel state parameters and can inform the network. Thus, the UE can provide, which is determined to be a good, link estimation for better link adaptation. This in turn can increase the link and system throughput of the 5G system providing huge gains over the conventional techniques.

In some embodiments the non-limiting term radio network node or simply network node is used and it refers to any type of network node serving UE and/or connected to other network nodes or network elements or any radio node from where a UE receives signal. Examples of radio network nodes are Node B, base station (BS), multi-standard radio (MSR) radio node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc. system.

In some embodiments the non-limiting term user equipment (UE) is used and it refers to any type of wireless device communicating with a radio network node in a cellular or mobile communication system. Examples of UE are target device, device to device (D2D) UE, machine type UE or UE capable of machine to machine (M2M) communication, PDA, iPad, tablet, mobile terminals, smart phone, laptop embedded equipped (LEE), laptop mounted equipment (LME), USB dongles etc.

Note that only 4×4 MIMO system is considered for describing the disclosed aspects, but the various aspects are equally applicable for 8 TX, and in general for any $N_t > 2$ Tx system whereby PMI and RI estimation is required. This disclosure interchangeably defines PMI as an index within a codebook or the PMI as a precoder itself depending on the context.

The embodiments are described in particular for closed-loop MIMO transmission scheme in NR, LTE based systems. However, the embodiments are applicable to any Radio Access Technology (RAT) or multi-RAT system where the UE operates using closed-loop MIMO (e.g., HSDPA, Wi-Fi/WLAN, WiMax, CDMA2000, and so on).

The embodiments are applicable to single carrier as well as to multicarrier (MC) or carrier aggregation (CA) operation of the UE in conjunction with MIMO in which the UE is able to receive and/or transmit data to more than one serving cells using MIMO. The term carrier aggregation (CA) is also called (e.g. interchangeably called) "multi-carrier system," "multi-cell operation", "multi-carrier operation", "multi-carrier" transmission and/or reception.

The following describes a few methods to obtain CSI, namely, by using mutual information and/or by using a capacity approach.

First, the technique for using mutual information will be discussed. As mentioned above, in NR, the UE needs to estimate a suitable CSI (e.g., CQI/PMI/RI) in order to maximize the throughput and simultaneously maintaining the block-error-rate (BLER) constraint which can be mathematically described by a joint (integer) optimization problem, $$\max_{CQI, PMI, RI} \text{Throughput}(CQI, PMI, RI) \quad \text{Equation (1)}$$

$$\text{subject to } BLER \leq \text{Threshold}$$

Unfortunately, this joint (discrete/integer) optimization problem does not have any closed-form solution. Hence, it can be attempted to estimate a suitable PMI/RI (independent of CQI); thereafter, a suitable CQI is estimated accordingly for the chosen PMI (and RI).

For example, consider a single-cell scenario having perfect time and synchronization, a received system model for (closed-loop) SM per sub-carrier (post-FFT) can be shown as:

$$Y = HWX + N \quad \text{Equation (2)}$$

where, $Y \in \mathbb{C}^{N_r \times 1}$ corresponds to a received signal vector, and $H \in \mathbb{C}^{N_r \times N_t}$ describes an overall channel matrix. A complex zero-mean Gaussian noise vector $n \in \mathbb{C}^{N_r \times 1}$ is having covariance $R_n$. An unknown complex data/symbol vector is denoted by $x \in \mathcal{A}^{N_L \times 1}$ (having normalized power $\mathbb{E}\{xx^H\} = R_x = I$) corresponding to M-QAM (e.g., 64-QAM) constellation $\mathcal{A}$. A (complex) precoder $W_{PMI} \in \mathbb{P}^{N_t \times N_L}$ is selected from a given/known codebook $\mathbb{P}$ having $N_p$ number of precoders (where, PMI={0, 1, ... $N_p$−1}) for a given rank $\leq \min\{N_r, N_t\}$.

The post-processing SINR per $i^{th}$ spatial layer for a given PMI, assuming linear-MMSE detector employed at the receiver, reads $$SINR_i = \frac{1}{[(W_{PMI}^H H^H R_n^{-1} H W_{PMI} + I_{N_L})^{-1}]_{i,i}} - 1 \quad \text{Equation (3)}$$

where $[A]_{i,i}$ corresponds to an $i^{th}$ diagonal element of a matrix A.

In order to estimate a suitable PMI/RI, so-called a link-quality metric (LQM), (e.g., mean mutual information) denoted as mMI (per sub-band/wide-band) is computed, as given below, $$mMI = \frac{1}{\text{rank}} \sum_{i=1}^{RI=\text{rank}} \sum_{k}^{K(i)} \log 2(1 + SINR_i[k]) \quad \text{Equation (4)}$$

where, $\mathcal{I}(SINR_i[k])$ is a mutual information that is a function of post-processing $SINR_i[k]$ (and modulation alphabet A) as given in Table 3 below, for $i^{th}$ spatial layer and $k^{th}$ resource-element. The number of resource-elements employed for the computation of the aforementioned LQM is given by a parameter K (depending on the wide-band/sub-band PMI estimate). Table 3 below illustrates Mutual information for 4-QAM, 16-QAM and 64-QAM.

TABLE 3

| Modulation Alphabet □ | Mutual Information per symbol |
|---|---|
| 4-QAM | $\mathcal{I}(SINR_i) = J(\sqrt{4SINR_i})$ |
| 16-QAM | $\mathcal{I}(SINR_i) \approx (1/2)J(0.8818\sqrt{SINR_i}) + (1/4)J(1.6764\sqrt{SINR_i}) + (1/4)J(0.9316\sqrt{SINR_i})$ |
| 64-QAM | $\mathcal{I}(SINR_i) \approx (1/3)J(1.1233\sqrt{SINR_i}) + (1/3)J(0.4381\sqrt{SINR_i}) + (1/3)J(0.4765\sqrt{SINR_i})$ |
| $J(a) \approx \begin{cases} -0.04210610\,a^3 + 0.209252\,a^2 - 0.00640081\,a, & 0 < a < 1.6363 \\ 1 - \exp(0.00181491\,a^3 - 0.142675\,a^2 - 0.08220540\,a + 0.0549608), & 1.6363 < a < \infty. \end{cases}$ | |

After having the estimate of mMI (per sub-band/wide-band), one can estimate the PMI and RI jointly employing unconstrained optimization which can be given as, $$\max_{PMI, RI} mMI(PMI, RI) \quad \text{Equation (5)}$$

Figure 7:
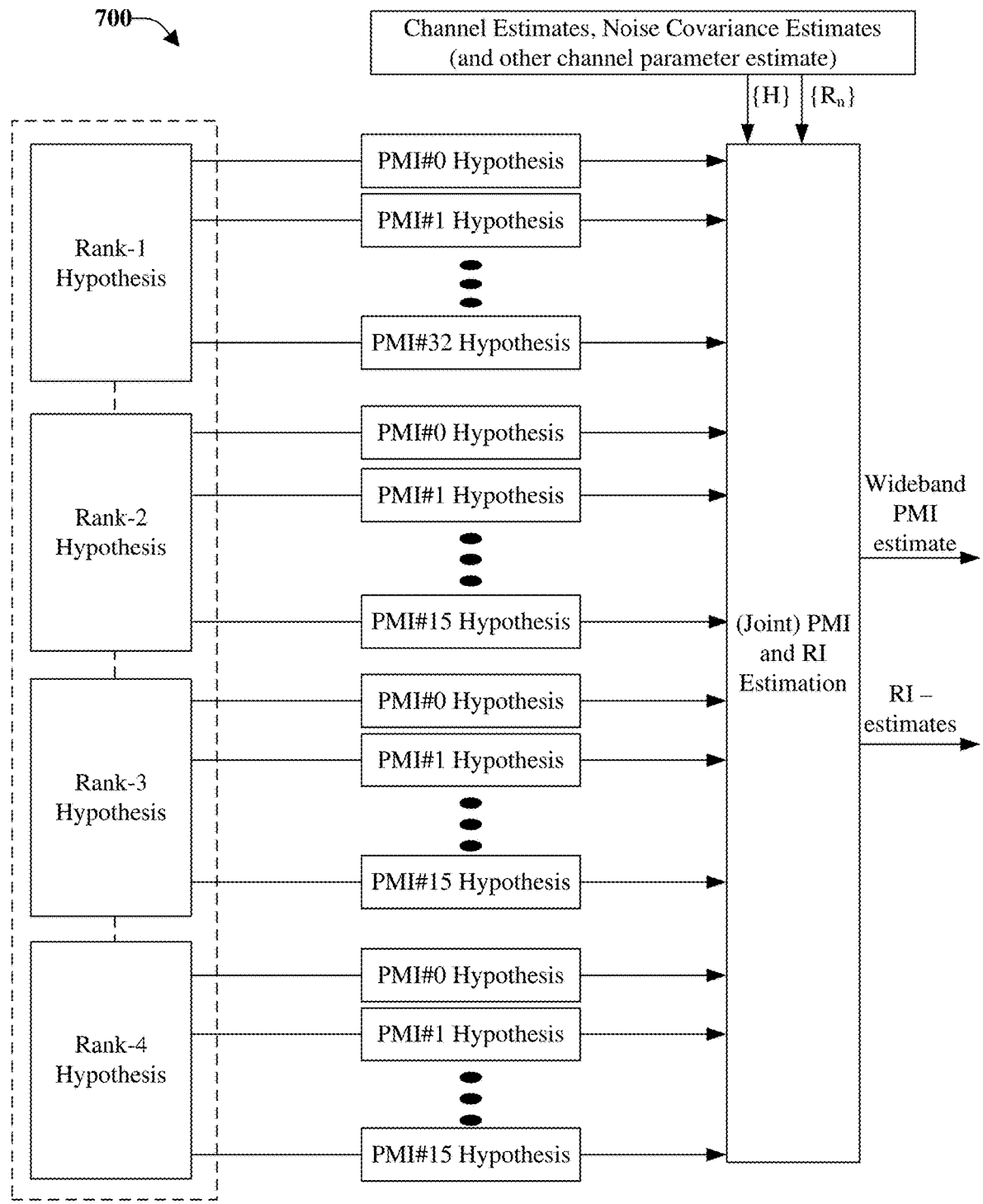
FIG. 7 illustrates an example, non-limiting pictorial view of a Precoding Matrix Indicator (PMI) search algorithm in accordance with one or more embodiments described herein.

FIG. 7 illustrates an example, non-limiting pictorial view 700 of a conventional Precoding Matrix Indicator (PMI) search algorithm in accordance with one or more embodiments described herein. Specifically, FIG. 7 illustrates how the PMI and RI are computed based on the mutual information approach. Note that the CQI is computed afterwards with the chosen PMI/RI.

Now, the technique for using a capacity approach will be discussed. The capacity approach is similar to the mutual information approach, however in for the capacity approach, instead of finding mutual information, the capacity is calculated as shown below, $$\text{capacity} = \frac{1}{\text{rank}} \sum_{i=1}^{RI=rank} \sum_{k}^{K(i)} \log 2(1 + SINRi[k])  \quad \text{Equation (6)}$$

Figure 8:
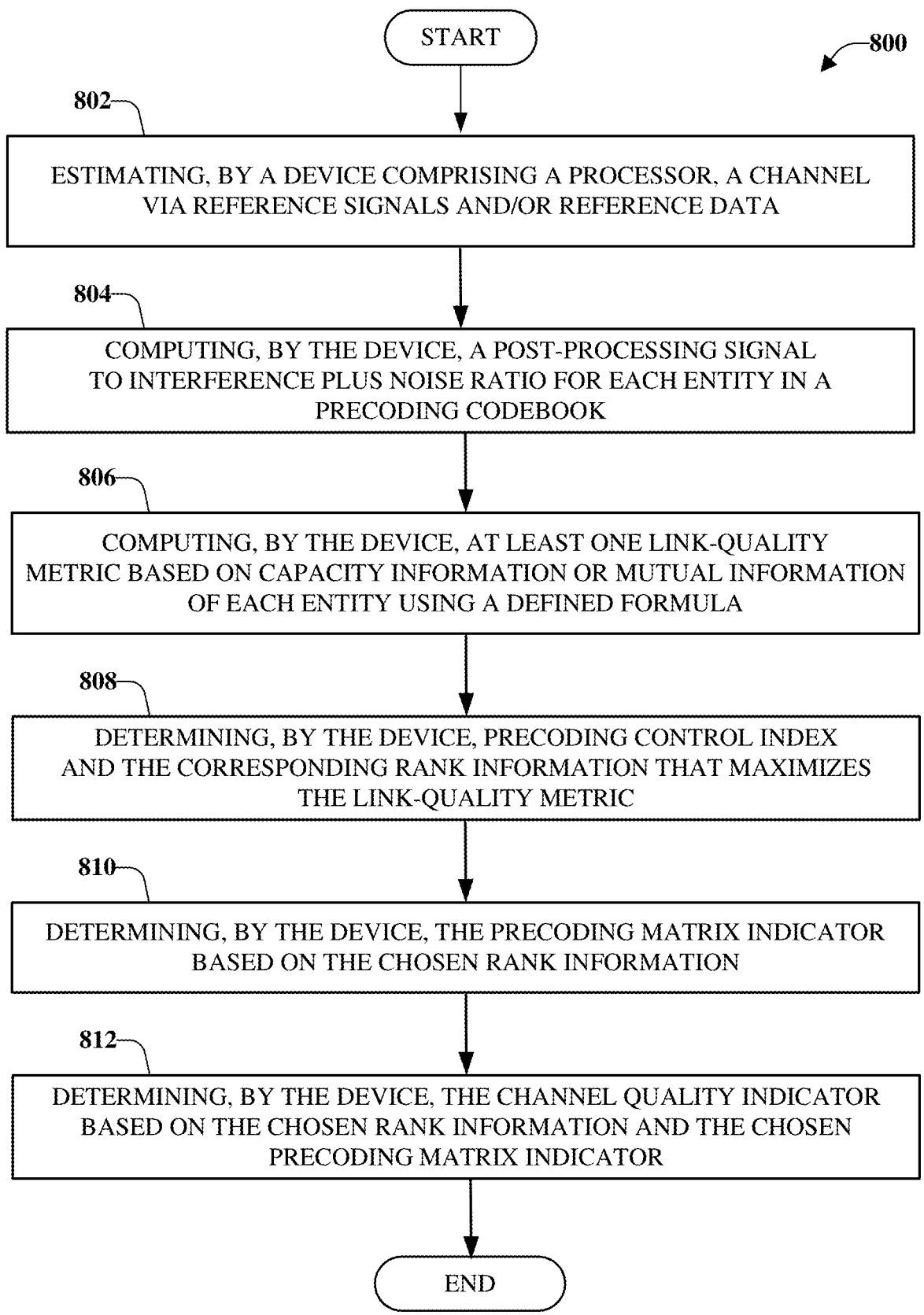
FIG. 8 illustrates an example, non-limiting, computer-implemented method for determining rank indicator and/or precoding rank indicator in accordance with one or more embodiments described herein.

FIG. 8 illustrates an example, non-limiting, computer-implemented method 800 for determining rank indicator and/or precoding rank indicator in accordance with one or more embodiments described herein. Repetitive description of like elements employed in other embodiments described herein is omitted for sake of brevity. The computer-implemented method 800 can be implemented by a device (e.g., a mobile device, a network device of a wireless network, and so on) comprising a processor. Alternatively, or additionally, a machine-readable storage medium can comprise executable instructions that, when executed by a processor, facilitate performance of operations for the computer-implemented method 800.

The computer-implemented method 800 can be utilized for finding RI/PMI as discussed below for both LQMs, namely, mutual information and capacity based LQMs. At 802, a channel can be estimated via reference signals and/or reference data. For example, the UE can estimate the channel via reference signals/data appropriately.

A post-processing SINR can be computed, at 804. For example, the post-processing SINR can be computed for each entity in the precoding codebook.

Further, at 806, LQMs can be computed. For example, computing the LQMs can be based on either capacity information or mutual information of each entity using a defined formula. The defined formula can be the formulas discussed above (e.g., Equation (1) through Equation (5) for the mutual information approach; Equation (6) for the capacity based approach).

At 808, the precoding control index and the corresponding RI which maximizes the LQM can be determined. Further, at 810, the PMI can be computed based on the RI chosen at 808. In addition, the CQI can be determined, at 812, based on the RI chosen at 808 and the PMI chosen at 810.

It can be observed that the network needs to know the value of K (i) for computing the CSI. However, the values of K are different for each transmission rank. This is because the DMRS overhead depends on the rank. Therefore, instead of assuming constant number of resources for each rank an adaptive number of resource elements can be utilized for computing the CSI. As shown in Table 4 below, which illustrates the percentage overhead for each transmission rank for Type 1, the value of overhead is different for each transmission rank.

TABLE 4

| Transmission rank | Overhead in % for each RB |
| --- | --- |
| 1 | 4.2 |
| 2 | 4.2 |
| 3 | 8.4 |
| 4 | 8.4 |

In another embodiment, the UE can assume the value of K(i) is equal to that of K(i) of the previously reported rank. That is, if in the previous report the UE reported transmission rank is equal to 4, then for the current CSI reporting the UE assumes constant number of resources equal to the overhead of 8.4% for each rank.

Described herein are systems, methods, articles of manufacture, and other embodiments or implementations that can facilitate determining channel state information in advanced networks. Facilitating a determination of channel state information for advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

Figure 9:
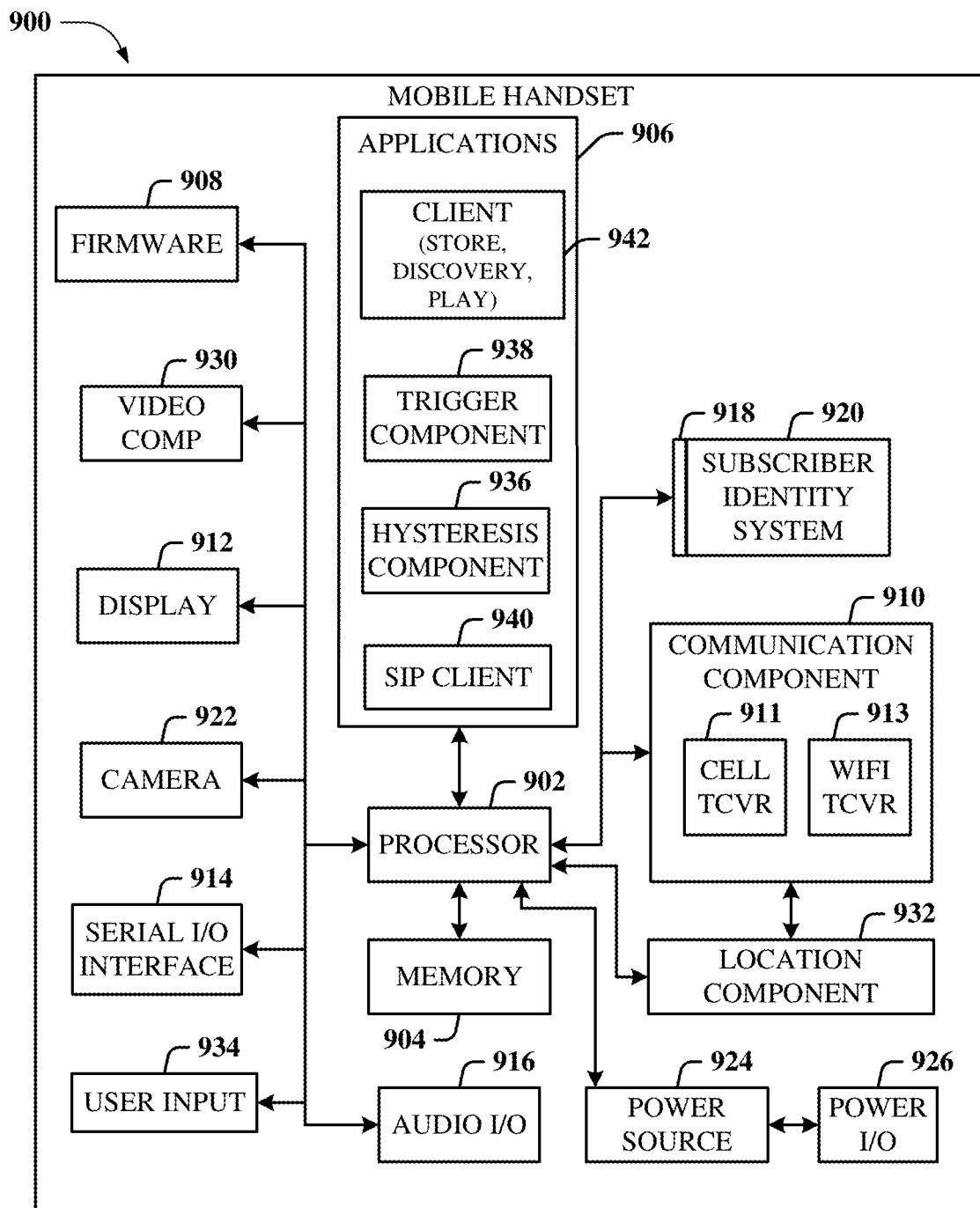
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
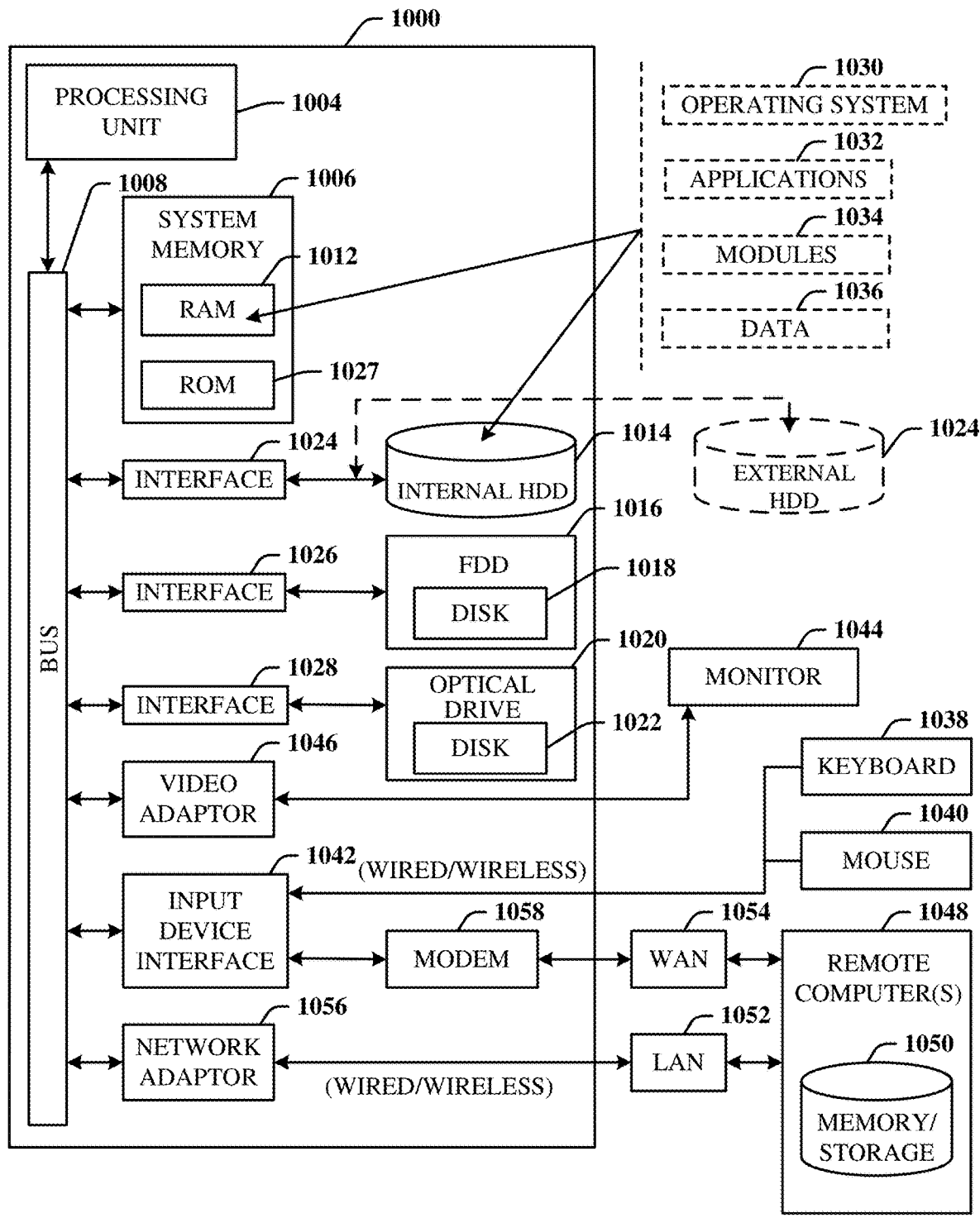
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 9 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a mobile device comprising a processor, a number of resources for a group of transmission ranks;
   determining, by the mobile device, respective link quality metrics for the transmission ranks of the group of the transmission ranks; and
   selecting, by the mobile device, a transmission rank from the group of the transmission ranks and a precoding matrix indicator, resulting in a selected precoding matrix indicator, wherein the selecting comprises selecting the transmission rank based on capacity information determined for the transmission rank satisfying a defined capacity information threshold, and wherein the capacity information is indicative of a data carrying capacity for the transmission rank.

2. The method of claim 1, wherein the selecting comprises using mutual information for a first selection of the transmission rank and a second selection of the precoding matrix indicator.

3. The method of claim 2, further comprising:
   determining, by the mobile device, channel quality indicator information based on the transmission rank and the precoding matrix indicator.

4. The method of claim 1, wherein the selecting comprises using a capacity-based approach.

5. The method of claim 1, wherein the selecting comprises selecting the transmission rank from the group of the transmission ranks, and wherein resource blocks of the transmission ranks in the group of the transmission ranks comprise respective overhead values.

6. The method of claim 1, wherein the selecting comprises selecting the transmission rank based on mutual information per symbol determined as a function of post-processing signal to interference plus noise ratio for the transmission ranks of the group of the transmission ranks.

7. The method of claim 1, further comprising:
transmitting, by the mobile device, the selected precoding matrix indicator to a network device of a group of network devices of a communications network, wherein the transmitting is via a fifth generation communications network.

8. The method of claim 7, wherein the transmitting comprises transmitting the precoding matrix indicator via an uplink channel configured to operate according to a fifth generation wireless network communication protocol.

9. A system, comprising:
a processor; and
a memory that stores executable instructions that, when executed by the processor, facilitate performance of operations, comprising:
determining, for transmission ranks of a group of transmission ranks, a number of resources and respective link quality metrics; and
choosing, a transmission rank from the group of transmission ranks and a precoding matrix indicator from a group of precoding matrix indicators, wherein the choosing comprises choosing the transmission rank based on capacity information determined for the transmission rank satisfying a defined capacity information threshold, and wherein the capacity information is indicative of a data carrying capacity for the transmission rank.

10. The system of claim 9, wherein the operations further comprise facilitating a first selection of the transmission rank and a second selection of the precoding matrix indicator based on mutual information per symbol determined as a function of post-processing signal to interference plus noise ratio for the transmission ranks of the group of transmission ranks.

11. The system of claim 9, wherein the operations further comprise facilitating a choice of the transmission rank and the precoding matrix indicator based on a capacity-based approach.

12. The system of claim 9, wherein the operations further comprise determining channel quality indicator information based on the transmission rank and the precoding matrix indicator.

13. The system of claim 9, wherein the operations further comprise:
facilitating a transmission of the precoding matrix indicator, selected from the group of precoding matrix indicators, to a network device of a group of network devices in a communications network.

14. The system of claim 13, wherein the operations further comprise transmitting the precoding matrix indicator via an uplink channel configured to operate according to a fifth generation wireless network communication protocol.

15. The method of claim 1, wherein the mobile device is configured to operate according to a fifth generation communications protocol.

16. A non-transitory machine-readable medium, comprising executable instructions that, when executed by a processor, facilitate performance of operations, comprising:
determining a number of resources for a group of transmission ranks;
determining, respective link quality metrics for the transmission ranks of the group of the transmission ranks; and
selecting a transmission rank from the group of the transmission ranks and a precoding matrix indicator, resulting in a selected precoding matrix indicator, wherein the selecting comprises selecting the transmission rank based on capacity information determined for the transmission rank satisfying a defined capacity information threshold, and wherein the capacity information is indicative of a data carrying capacity for the transmission rank.

17. The non-transitory machine-readable medium of claim 16, wherein the selecting comprises selecting the transmission rank and the precoding matrix indicator comprises using mutual information for a first selection of the transmission rank and a second selection of the precoding matrix indicator.

18. The non-transitory machine-readable medium of claim 16, wherein the operations further comprise:
determining channel quality indicator information based on the transmission rank and the precoding matrix indicator.

19. The non-transitory machine-readable medium of claim 16, wherein the operations further comprise:
transmitting the selected precoding matrix indicator to network equipment.

20. The non-transitory machine-readable medium of claim 19, wherein the network equipment is configured to operate according to a fifth generation communications protocol, and wherein the transmitting is via a fifth generation communications network.

* * * * *